United States Patent [19]

Harandi et al.

[11] Patent Number: 4,951,613
[45] Date of Patent: Aug. 28, 1990

[54] HEAT TRANSFER TO ENDOTHERMIC REACTION ZONE

[75] Inventors: Mohsen N. Harandi, Lawrenceville; Hartley Owen, Belle Mead, both of N.J.

[73] Assignee: Mobil Oil Corp., New York, N.Y.

[21] Appl. No.: 269,032

[22] Filed: Nov. 9, 1988

[51] Int. Cl.$^5$ ............................................... F22B 1/00
[52] U.S. Cl. .................................. 122/4 D; 122/7 R; 422/138; 422/146
[58] Field of Search ............... 110/203; 122/7 R, 4 D; 422/146, 138

[56] References Cited

U.S. PATENT DOCUMENTS

| | | | |
|---|---|---|---|
| 2,703,565 | 3/1955 | Lustig | 122/24 X |
| 3,756,942 | 9/1973 | Cattanach . | |
| 3,759,821 | 9/1973 | Brennan et al. . | |
| 3,760,024 | 9/1973 | Cattanach . | |
| 3,898,043 | 8/1975 | Schutte et al. | 422/146 X |
| 4,258,017 | 3/1981 | Gelfand | 110/203 X |
| 4,690,802 | 9/1987 | Jenkinson | 422/146 X |

OTHER PUBLICATIONS

Kirk-Othmer Encyclopedia of Chemical Technology, Third Edition, vol. 9, John Wiley and Sons, 1980, pp. 706-709.

"M2 Forming-A Process for Aromatization of Light Hydrocarbons", N.Y. Chen and T. Y. Yan, 25 Ind. Eng. Chem. Process Des. Dev. 151 (1986).

Primary Examiner—Edward G. Favors
Attorney, Agent, or Firm—Alexander J. McKillop; Charles J. Speciale; Robert B. Furr, Jr.

[57] ABSTRACT

A method and apparatus are disclosed for transferring heat to a reaction zone in which hot flue gas is passed through a heat exchanger positioned inside the reaction zone. The flue gas may be generated in a catalyst regenerator, a combustion chamber, or both. The combustion chamber may be external or internal to the heat exchanger. The invention is particularly useful for transferring heat to an endothermic fluid-bed catalytic reaction such as dehydrogenation or aromatization.

34 Claims, 3 Drawing Sheets

HEAT TRANSFER TO ENDOTHERMIC REACTION ZONE

FIELD OF THE INVENTION

This invention relates to endothermic hydrocarbon conversion processes. In particular, the invention addresses the problem of transferring heat to endothermic hydrocarbon conversion processes, examples of which include dehydrogenation and aromatization.

BACKGROUND OF THE INVENTION

Dehydrogenation and aromatization of $C_2$–$C_{10}$ paraffins over a zeolite catalyst having the structure of ZSM-5, for example, requires a heat input of at least about 500 BTU per pound of feed at a reaction temperature of about 510° C. to 705° C. (950° F. to 1300° F.). The problem of transferring heat to the fluidized-bed process has been an obstacle to its commercial development. Methods known in the art to transfer heat to the fluidized-bed reaction zone include preheating the catalyst or positioning a heat exchanger in the fluidized catalyst bed. Preheating the catalyst separately to around 870° C. (1600° F.) undesirably accelerated catalyst deactivation.

In previous designs using a circulating inert gas heat transfer medium, the inert gas is heated by passing it through the tubes of a process furnace. The hot gas is then charged to a reactor heat exchanger positioned inside the fluidized-bed reaction zone. The hot inert gas is cooled as it passes through the reactor heat exchanger, indirectly transferring the endothermic heat of reaction to the surrounding fluidized bed and is then withdrawn from the reactor heat exchanger and typically cooled to about 38° C. (100° F.) to minimize the cost of compressing and recirculating the gas.

SUMMARY OF THE INVENTION

The present invention accomplishes the same result more simply and economically by eliminating the inert gas recycle, compressing only the combustion air, cooling effluent gas from the reactor heat exchanger to only 190° C. (375° F.) and then exhausting the cooled gas through a stack. Rather than compressing the entire circulating gas volume, the present invention compresses only a stream of combustion air. The combustion air is charged under pressure with a fuel to a combustion chamber. Flue gas from the catalyst regenerator may also be added. Hot flue gas is generted in the combustion chamber and regenerator flue gas, if added, is heated by direct exchange. By generating hot gas rather than circulating gas through furnace tubes, the inefficiency associated with indrect heat transfer is eliminated. Thus by generating hot gas, the invention reduced the required energy input for compressing and heating the gas.

Circulating gas systems typically require cooling the gas before compression and recirculation. Rather than cooling the gas stream from its typical reactor outlet temperature of about 760° C. (1400° F.) to about 38° C. (100° F.), as is preferred for efficient compression, the present invention cools the flue gas stream to about 190° C. (375° F.) and exhausts the gas through a stack, thereby reducing energy requirements again by decreasing or eliminating exchanger area and cooling water requirements.

The invention provides a method and apparatus for transferring thermal energy to a fluidized-bed reaction zone. In its method aspects, the invention comprises charging fuel to a combustion zone, charging oxygen-containing gas to the combustion zone, withdrawing flue gas from the combustion zone, flowing the fluw gas through a heat exchanger positioned inside the reaction zone, transferring heat from the flue gas to the reaction zone, withdrawing flue gas from the heat exchanger, and cooling the flue gas. The invention may also comprise charging fuel and oxygen-containing gas to a heat exchanger positioned inside the reaction zone, combusting the fuel, and transferring heat from the resulting flue gas to the reaction zone. The method of the present invention may further comprise regenerating the finely divided catalyst in the presence of oxygen-containing regeneration gas to form regenerator flue gas, mixing the regenerator flue gas with the combustion zone flue gas to form a combined flue gas stream and indirectly transferring thermal energy from the combined flue gas stream to the fluidized-bed reaction zone.

The invention further encompasses a reactor system for the conversion of hydrocarbons in a fluidized bed of catalyst comprising a vertical cylindrical reactor having an inlet nozzle and an outlet nozzle, a heat exchanger comprising a plurality of heat exchanger tubes positioned inside the reactor, a heat exchanger inlet pipe extending through the shell of the reactor in communication with the heat exchanger, a heat exchanger outlet pipe extending throug the reactor shell in communication with the heat exchanger, means in communication with the reactor for separating reaction products from catalyst particles, a combustion chamber having valved inlet ports for fuel, oxygen-containing gas and regenerator flue gas, as well as an outlet port for combustion chamber flue gas, means for charging oxygen-containing gas to said combustion chamber, and conduit means connecting the combustion chamber outlet port with the heat exchanger inlet pipe.

DETAILED DESCRIPTION

Figure 1:
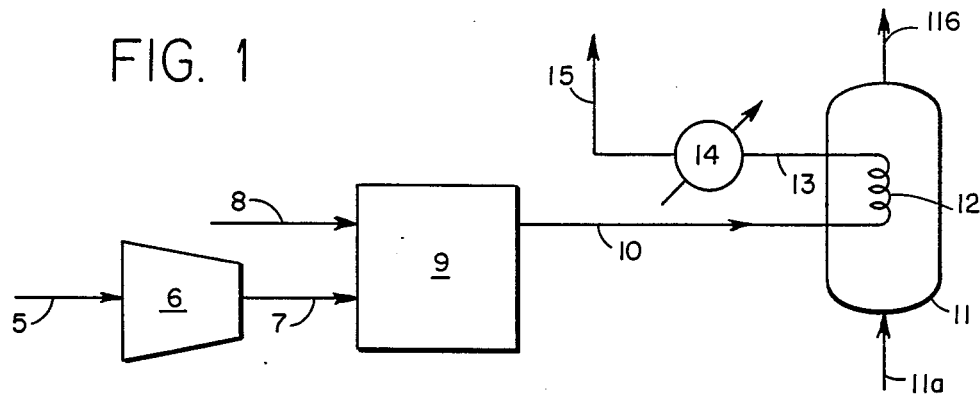
FIG. 1 is a simplified schematic diagram showing a first embodiment of the invention in which a reaction zone is heated by a flue gas generated in a combustion zone.

The method and apparatus of the present invention increase heat transfer efficiency to a fluidized-bed reaction zone. A method and apparatus are also disclosed for the conversion of an aliphatic hydrocarbon stream. Benefits of the invention are most pronounced in highly endothermic conversion processes such as paraffin dehydrogenation and/or aromatization.

AROMATIZATION PROCESS

The following representative U.S. patents exemplify the feed compositions and process conditions for generally endothermic hydrocarbon upgrading reactions compatible with the process and apparatus of the invention.

U.S. Pat. No. 3,756,942, incorporated by reference as if set forth at length herein, discloses a process for the preparation of aromatic compounds in high yields which involves contacting a particular feed consisting essentially of mixtures of paraffins and/or olefins, and/or naphthenes with a crystalline aluminosilicate, e.g. ZSM-5, under conditions of temperature and space velocity such that a significant portion of the feed is converted directly into aromatic compounds.

U.S. Pat. No. 3,759,821, incorporated by reference as if set forth at length herein, discloses a process for upgrading catalytically cracked gasoline.

U.S. Pat. No. 3,760,024, incorporated by reference as if set forth at length herein, teaches a process for the preparation of aromatic compounds involving contacting a feed consisting essentially of $C_2$–$C_4$ paraffins and/or olefins with a crystalline aluminosilicate, e.g. ZSM-5.

Hydrocarbon feedstocks which can be converted according to the present process include various refinery streams including coker gasoline, FCC gasoline, $C_5$–$C_7$ fractions of straight run naphthas and pyrolysis gasoline, as well s raffinates from a hydrocarbon mixture which has had aromatics removed by a solvent extraction treatment. Examples of such solvent extraction treatments are described on pages 706–709 of the *Kirk-Othmer Encyclopedia of Chemical Technology*, Third Edition, Vol. 9, John Wiley and Sons, 1980. A particular hydrocarbon feedstock derived from such a solvent extraction treatment is a Udex raffinate. A paraffinic hydrocarbon feedstock suitable for use in the present process may also comprise at least 75 percent by weight, e.g. at least 85 percent by weight, of paraffins having from 5 to 10 carbon atoms. The most preferred feedstocks are refinery streams containing propane and butane.

TABLE 1

| | | |
|---|---|---|
| WHSV | Broad range | 0.3–300 hr$^{-1}$ |
| | Preferred range | 1–10 hr$^{-1}$ |
| OPERATING PRESSURE | Broad | 170–2170 kPa (10–300 psig) |
| | Preferred | 310–790 kPa (30–100 psig) |
| OPERATING TEMPERATURE | Broad | 540–820° C. (1000–1500° F.) |
| | Preferred | 560–620° C. (1050–1150° F.) |

The article "M2 Forming-A Process for Aromatization of Light Hydrocarbons" by N. Y. Chen and T. Y. Yan, 25 IND. ENG. CHEM. PROCESS DES. DEV. 151 (1986) discusses the mechanisms of dehydrogenation and aromatization and is incorporated by reference as if set forth at length herein, but is not presented to limit the invention by theory.

CATALYSTS

The members of the class of zeolites useful herein have an effective pore size of generally from about 5 to about 8 Angstroms, such as to freely sorb normal hexane. In addition, the structure must provide constrained access to larger molecules. It is sometimes possible to judge from a known crystal structure whether such constrained access exists. For example, if the only pore windows in a crystal are formed by 8-membered rings of silicon and aluminum atoms, then access by molecules of larger cross-section than normal hexane is excluded and the zeolite is not of the desired type. Windows of 10-membered rings are preferred, although, insome instances, excessive puckering of the rings or pore blockage may render these zeolites ineffective.

Although 12-membered rings in theory would not offer sufficient constraint to produce advantageous conversions, it is noted that the puckered 12-ring structure of TMA offretite does show some constrained access. Other 12-ring structures may exist which may be operative for other reasons, and therefore, it is not the present intention to entirely judge the usefulness of the particular zeolite solely from theoretical structural considerations.

A convenient measure of the extent to which a zeolite provides control to molecules of varying sizes to its internal structure is the Constraint Index of the zeolite. The method by which the Constraint Index is determined is described in U.S. Pat. No. 4,016,218, incorporated herein by reference for details of the method. U.S. Pat. No. 4,696,732 discloses Constraint Index values for typical zeolite materials and is incorporated by reference as if set forth at length herein.

In a preferred embodiment, the catalyst is a zeolite having a Constraint Index of between about 1 and about 12. Examples of such zeolite catalysts include ZSM-5, ZSM-11, ZSM-12, ZSM-22, ZSM-23, ZSM-35 and ZSM-48.

Zeolite ZSM-5 and the conventional preparation thereof are described in U.S. Pat. No. 3,702,886, the disclosure of which is incorporated herein by reference. Other preparations for ZSM-5 are described in U.S. Pat. Nos. Re. 29,948 (highly siliceous ZSM-5); 4,100,626 and 4,139,600, the disclosure of these is incorporated herein by reference. Zeolite ZSM-11 and the conventional preparation thereof are described in U.S. Pat. No. 3,709,979, the disclosure of which is incorporated herein by reference. Zeolite ZSM-12 and the conventional preparation thereof are described in U.S. Pat. No. 3,832,449, the disclosure of which is incorporated herein by reference. Zoelite ZSM-23 and the conventional preparation thereof are described in U.S. Pat. No. 4,076,842, the dislcosure of which is incorporated herein by reference. Zeolite ZSM-35 and the conventional preparation thereof are described in U.S. Pat. No. 4,016,245, the disclosure of which is incorporated herein by reference. Another preparation of ZSM-35 is described in U.S. Pat. No. 4,107,195, the disclosure of which is incorporated herein by reference. ZSM-48 and the conventional preparation thereof is taught by U.S. Pat. No. 4,375,573, the disclosure of which is incorporated herein by reference.

Gallium-containing zeolite catalysts are particularly preferred for use in the present invention and are disclosed in U.S. Pat. No. 4,350,835 and U.S. Pat. No. 4,686,312, both of which are incorporated by reference as if set forth at length herein.

Zinc-containing zeolite catalysts are useful in the present invention, for example, U.S. Pat. No. 4,392,989 and U.S. Pat. No. 4,472,535, both of which are incorporated by reference as if set forth at length herein.

Catalysts such as ZSM-5 combined with a Group VIII metal described in U.S. Pat. No. 3,856,872, incorporated by reference as if set forth at length herein, are also useful in the present invention.

Paraffin dehydrogenation catalysts also include oxides and sulfides of Groups IVA, VA, VIA, VIIA and VIIIA and mixtures thereof on an inert support such as alumina or silica-alumina. Thus, dehydrogenation may be promoted by sulfides and oxides of titanium, zirconium vanadium, niobium, tantalum, chromium, molybdenum, tungsten and mixtures thereof. Oxides of chromium alone or in conjunction with other catalytically active species have been shown to be particularly useful in dehydrogenation. Other catalytically active compounds include sulfides and oxides of manganese, iron, cobalt, rhodium, iridium, nickel, palladium, platinum and mixtures thereof.

The above-listed metals of Groups IVA, VA, VIA, VIIA and VIIIA may also be exchanged onto zeolites to provide a zeolite catalyst having dehydrogenation activity. Platinum has been found to be particularly useful for promoting dehydrogenation over zeolite catalysts.

DESCRIPTION OF THE FIRST EMBODIMENT

In a first embodiment of the present invention, a reaction zone is heated by flue gas. The reaction zone may comprise a fixed, fluid, or moving bed reaction zone. Flue gas is charged through a heat exchanger positioned within the reaction zone. The flue gas is generated in an in-line combustion chamber.

Referring now to FIG. 1, an oxygen-containing gas, typically air, is charged through conduit 5 to compressor 6. The compressed stream is discharged into line 7 at a pressure up to about 446 kPa (50 psig) and flows into combustion chamber 9 together with fuel flowing through line 8.

Flue gas is then withdrawn from combustion chamber 9 at a temperature above about 649° C. (1800° F.), typically about 871° C. (1600° F.) through line 10 to heat exchanger 12 positioned inside reactor 11 which is equipped with reactor inlet line 11a and reactor outlet line 11b. Heat is transferred from the flue gas flowing through heat exchanger 12 to the reaction zone in reactor 11. Reactor 11 typically contains a solid catalyst and may be of a fixed or fluid bed configuration. Flue gas is withdrawn via line 13 and enters cooler 14 which may optionally comprise a heat recovery system such as reactor feed preheat and/or steam generation. Alternatively, cooler 14 may preheat oxygen-containing gas prior to charging the gas to combustion zone 9. The flue gas is cooled to about 191° C. (375° F.) and exhausted to an atmospheric vent (not shown) through line 15.

DESCRIPTION OF THE SECOND EMBODIMENT

In a seocnd embodiment of the present invention, a hydrocarbon feed is reacted in a fluid bed reaction zone. Deactivated catalyst is continuously withdrawn from the reaction zone and oxidatively regenerated in a regenerator vessel. The regenerator is operated with excess oxygen such that the resulting flue gas may be charged to a combustion zone together with fuel and optionally an additional oxygen-containing gas, such as air to evolve a flue gas. The hot flue gas then heats the fluid bed reaction zone as it passes through a heat exchanger positioned inside the reactor.

Figure 2:
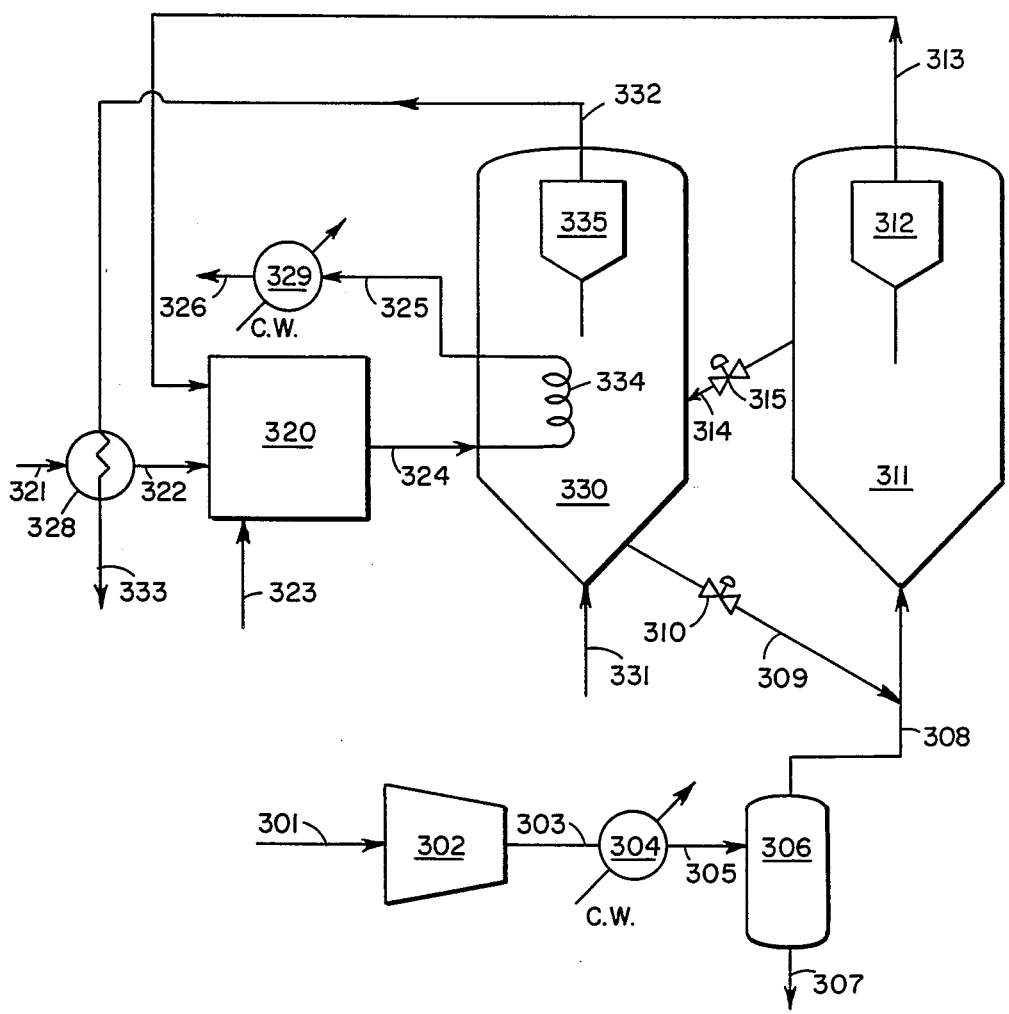
FIG. 2 is a simplified schematic diagram of a second embodiment of the invention in which a fluidized bed reaction zone is heated by a flue generated from the combustion of fuel in the presence of oxygen-containing regenerator flue gas in an external combustion zone.

Referring now to FIG. 2, an oxygen-containing gas, such as air, flows through line 301 to compressor 302 where it is compressed to a pressure of up to about 446 kPa (50 psig). The compressed oxygen-containing gas is then dired by charging the gas through line 303 to cooler 304 where cooling water indirectly cools the compressed gas to a temperature of about 38° C. (100° F.). The cooled gas is then withdrawn from exchanger 304 through line 305 and charged to knock out drum 306. Liquid water flows out of knock out drum 306 through line 307 to a process sewer (not shown) while the dried, compressed oxygen-containing gas flows overhead through line 308 and is combined with deactivated catalyst flowing through line 308 and is combined with deactivated catalyst flowing through line 309 which is equipped with control valve 310. The finely divided catalyst is fluidized in the stream of oxygen-containing gas and enters regenerator vessel 311.

The flow of oxygen-containing gas is maintained at a rate sufficient to fluidize the deactivated catalyst int he regenerator vessel in a state of sub-transport fluidization. Further, the flow of oxygen-containing gas is maintained at a level sufficient to exceed the stoichiometric requirements for complete combustion of the coke which is deposited on the deactivated catalyst. One advantage of operating the regenerator at high excess oxygen levels is that the increased gas throughput cools the regenerator and permits effective regeneration at lower temperatures. Such regeneration promotes longer catalyst life. Preferably, regenerator flue gas leaving vessel 311 through line 313 cotnains an amount of oxygen up to that sufficient to combust the fuel charged downstream to combustor 320.

Reactivated catalyst is withdrawn from regenerator 311 through line 314 which is equipped with control valve 315, and returned to reactor 330. Reactivated catalyst is separated from the oxygen-containing regenerator flue gas in one or more cyclone separators 312 positioned near the top of regenerator 311. Sintered meatl filters may optionally be used in place of, or in conjunction with, such cyclone separators.

Oxygen-containing regenerator flue gas from regenerator 311 is charged through line 313 to combustion zone 320 and is combined with fuel which flows to combustion zone 320 through line 323. Supplemental oxygen-containing gas, typically air, may be charged to combustion zone 320 via line 322. The supplemental oxygen-containing gas may optionally be preheated with hot reactor effluent from reactor 330. In this case, oxygen-containing gas is charged through line 321 to heat exchanger 328 where it is indirectly heated by hot reactor effluent flowing through line 332. The cooled reactor effluent is withdrawn from heat exchanger 328 through line 333 and is routed to further processing or storage (not shown), while the heated supplemental oxygen-containing gas is charged to combustion zone 320 through line 322.

Hot flue gas is withdrawn from combustion zone 320 through line 324 and charged to heat exchanger 334 which is positioned inside fluidized-bed reactor 330. Heat is transferred from the hot flue gas flowing the tubes of heat exchanger 334 to the surrounding fluidized bed reaction zone. The cooled flue gas is then withdrawn form exchanger 334 through line 325 and charged to effluent cooler 329 where it is indirectly exchanged with cooling water to a temperature of about 190° C. (375° F.). Effluent cooler 329 may also comprises a heat recovery unit. The cooled flue gas is then withdrawn from effluent cooler 329 through line 326 and vented to atmosphere through a stack (not shown).

DESCRIPTION OF THE THIRD EMBODIMENT

In a third embodiment of the present invention, a hydrocrabon feed is reacted in a fluid bed reaction zone. Deactivated catalyst is continuously withdrawn from the reaction zone and oxidatively regenerated in a regenerator vessel. The regenerator is operated with excess oxygen such that the resulting flue gas may be charged to a combustion zone together with fuel and optionally an additional oxygen-containing gas, such as air to evolve a flue gas. The hot flue gas then heats the fluid bed reaction zone as it passes through a heat exchanger postioned inside the reactor. The most preferred configuration is described in which the combustion zone is located within the heat exchanger positioned inside the reactor.

Figure 3:
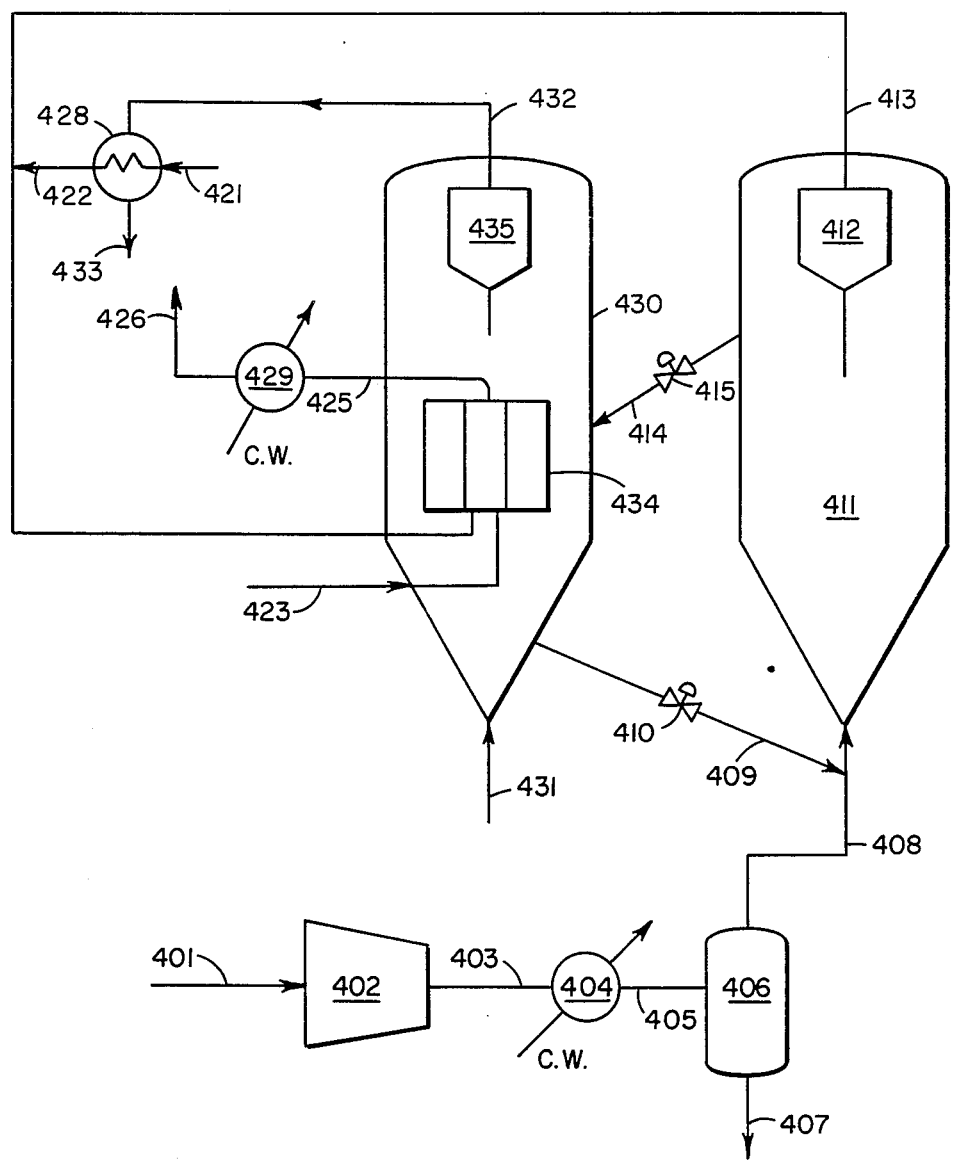
FIG. 3 is a simplified schematic diagram illustrating a third embodiment of the present invention in which a fludized-bed reaction zone is heated by a flue gas generated from the combustion of fuel in the presence of oxygen-containing regenerator flue gas in the tubes of a heat exchanger positioned within the fluidized-bed reaction zone.

Reffering now to FIG. 3, an oxygen-containing gas, such as air, flows, through line 401 to compressor 402 where it is compressed to a pressure of up to about 446 kPa (50 psig). The compressed oxygen-containing gas is then dried by charging the gas through line 403 to cooler 404 where cooling water indirectly cools the compressed gas to a temperature of about 38° C. (100° F.). The cooled gas is then withdrawn from exchanger 404 through line 405 and charged to knock out drum 406. Liquid water flows out of knock out drum 406 through line 407 to a process sewer (not shown) while the dried, compressed oxygen-containing gas flows overhead through line 408 and is combined with deactivated catalyst flowing through line 409 which is equipped with control valve 410. The finely divided catalyst is fluidized in the stream of oxygen-containing gas and enters regenerator vessel 411.

The flow of oxygen-containing gas is maintained at a rate sufficient to fluidize the deactivated catalyst in the regenerator vessel in a state of sub-transport fluidization., Further, the flow of oxygen-containing gas is maintained at a level sufficient to exceed the stoichiometric requirements for complete combustion of the coke which is deposited on the deactivated catalyst. Preferably, regenerator flue gas leaving vessel 411 through line 413 contains an amount of oxygen up to that sufficient to burn the fuel charged downstream to the combustion gas zone maintained in heat exchanger 434.

Regenerated catalyst is withdrawn from regenerator 411 through line 414 which is equipped with control valve 415, and returned to reactor 430. One or more cyclone separators 412 positioned near the top of regenerator 411 separate regenerated catalyst from oxygen-containing regenerator flue gas. Sintered metal filters may optionally be used in place of, or in conjunction with, the cyclone separators.

The oxygen-containing regenerator flue gas from regenerator 411 is charged through line 413 to a combustion zone maintained within exchanger 434 and is combined with fuel which flows to exchanger 434 through line 423. Supplemental oxygen-containing gas, typically air, may be charged to exchanger 434 via line 422. The supplemental oxygen-containing gas may optionally be preheated with hot reactor effluent from reactor 430. In this case, oxygen-containing gas is charged through line 421 to heat exchanger 428 where it is indirectly heated by hot reactor effluent flowing through line 432. The cooled reactor effluent is withdrawn from heat exchanger 428 through line 433 and is routed to further processing or storage (not shown), while the heated supplemental oxygen-containing gas is charged to exchanger 434 through line 422 and 413. The fuel, typically fuel gas or other light hydrocarbon gas, burns inside exchanger 434 to evolve flue gas which flows upward through the tubes of the exchanger.

Heat is transferred from the hot flue gas flowing through the tubes of heat exchanger 434 to the surrounding fluidized be reaction zone. The cooled flue gas is then withdrawn form exchanger 434 through line 425 and charged to effluent cooler 429 where it is indirectly exchanged with cooling water to a temperature of about 191° C. (375° F.). Effluent cooler 429 may optionally comprise a heat recovery unit. The cooled flue gas is then withdrawn from effluent cooler 429 through line 426 and vented to atmosphere through a stack (not shown).

Figure 4:
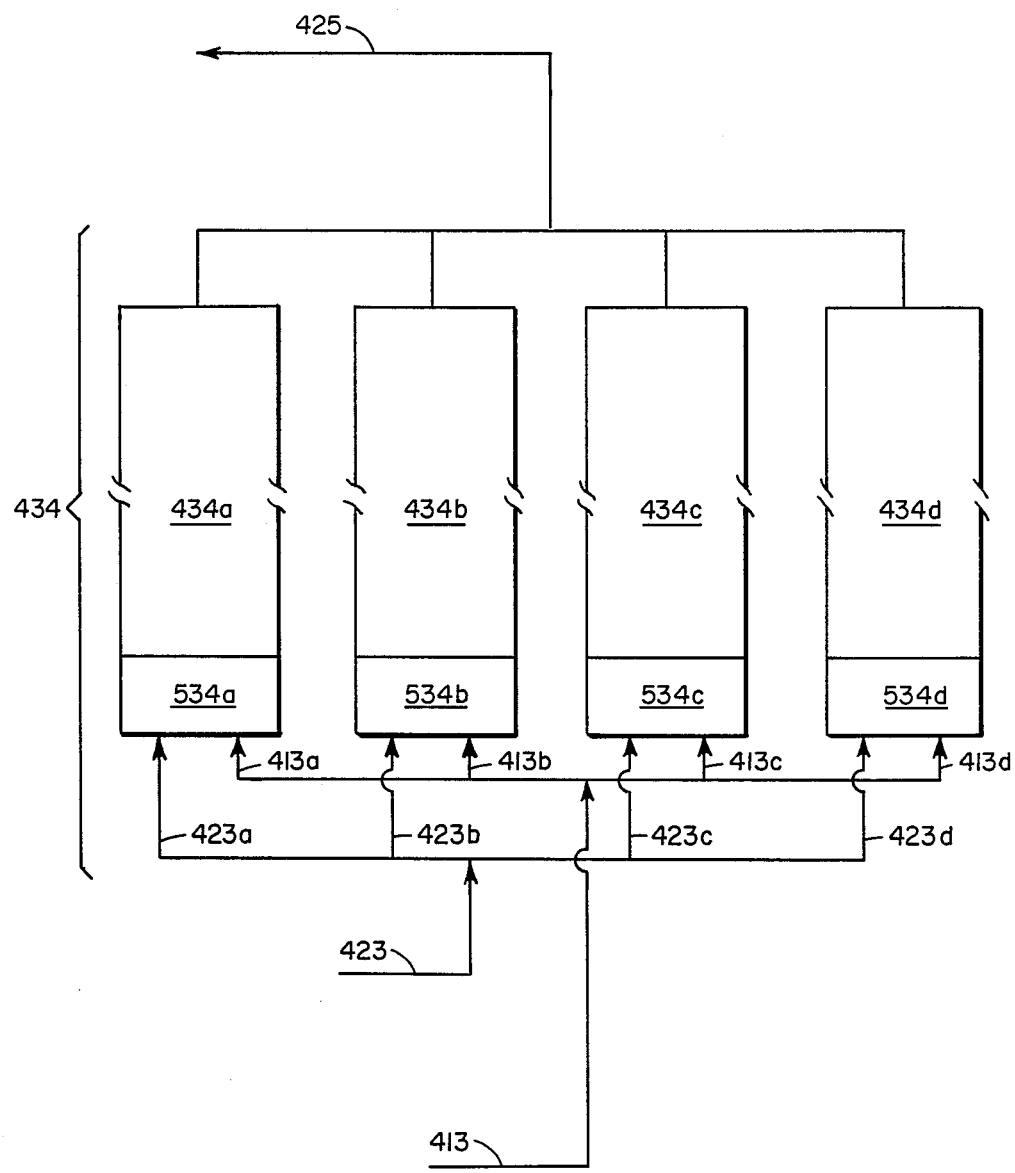
FIG. 4 is a simplified flow diagram showing a heat exchanger useful in a third embodiment of the invention.

FIG. 4 shows a simplified diagram of the most preferred configuration for heat exchanger 434. As described above, oxygen-containing combustion gas, typically air, flows through line 413 to exchanger 434 which consists of a plurality of tubes 434a, 434b, 434c and 434d (only four are shown). Burner assemblies 534a, 534b, 534c and 534d are located in lower sections of tubes 434a, 434b, 434c and 434d, respectively. Line 413 supplies combustion gas to each burner assembly through inlet lines 413a, 413b, 413c and 413d (only four are shown), while line 423 flows fuel to the burners through lines 423a, 423b, 423c and 423d (only four are shown). The burners generate hot flue gas which flows through the tubes into outlet line 425 as described above.

Changes and modifications in the specifically described embodiments can be carried out without departing from the scope of the invention which is intended to be limited only by the scope of the appended claims.

What is claimed is:

1. A process for transferring heat to a fluid-bed reaction zone containing a finely divided solid catalyst comprising the steps of
   (a) evolving an oxygen-containing regenerator flue gas by charging a greater amount of oxygen-containing gas to a fluid-bed regeneration zone than is stoichiometrically required to oxidatively regenerate said finely divided solid catalyst;
   (b) withdrawing said oxygen-containing regenerator flue gas from said fluidized-bed regeneration zone;
   (c) charging fuel to a comustion zone;
   (d) charging said oxygen-containing regenerator flue gas to said combustion zone to evolve a combustion zone flue gas;
   (e) withdrawing said combustion zone flue gas from said combustion zone;
   (f) flowing said combustion zone flue through a heat exchanger positioned within said reaction zone;
   (g) transferring heat from said combustion zone flue gas to said reaction zone;
   (h) withdrawing said combustion zone flue gas from said heat exchanger; and
   (i) cooling said combustion zone flue gas.

2. The process of claim 1 wherein said solid catalyst comprises a zeolite.

3. The process of claim 2 wherein said zeolite has a Constraint Index of between about 1 and about 12.

4. The process of claim 3 wherein said zeolite has the structure of at least one of the group consisting of ZSM-5, ZSM-11, ZSM-22, ZSEM-23, ZSM-35 and ZSM-48.

5. The process of claim 4 wherein said zeolite has the structure of ZSM-5.

6. The process of claim 5 wherein said zeolite contains gallium.

7. The process of claim 6 wherein said catalyst comprises a metal on an inert support.

8. A process for transferring heat to a fluid-bed reaction zone containing a finely divided solid catalyst comprising the steps of:
   (a) evolving an oxygen-containing regenerator flue gas by charging a greater amount of oxygen-containing gas to a fluid-bed regeneration zone than is stoichiometrically required to oxidatively regenerate said finely divided solid catalyst;
   (b) withdrawning said oxygen-containing regenerator flue gas from said fluidized-bed regeneration zone;
   (c) charging fuel to said heat exchanger positioned within said reaction zone;
   (d) charging said oxygen-containing regenerator flue gas to said heat exchanger;
   (e) combustion said fuel to generate heat exchanger flue gas within said heat exchanger;
   (f) transferring heat from said heat exchanger flue gas to said reaction zone;
   (g) withdrawing said heat exchanger flue gas from said heat exchanger; and
   (h) cooling said heat exchanger flue gas.

9. The process of claim 8 wherein said solid catalyst comprises a zeolite.

10. The process of claim 9 wherein said zeolite has a Contstraint Index of between about 1 and about 12.

11. The proces of claim 10 wherein said zeolite has the structure of at least one of the group consisting of ZSM-5, ZSM-11, ZSM-22, ZSM-23, ZSM-35 and ZSM-48.

12. The process of claim 11 wherein said zeolite has the structure of ZSM-5.

13. The process of claim 12 wherein said zeolite contains gallium.

14. The process of claim 8 wherein said catalyst comprises a metal on an inert support.

15. The process of claim 1 wherein the pressure maintained within said reaction zone exceeds the pressure maintained within said heat exchanger.

16. The process of claim 8 wherein the pressure maintained within said reaction zone exceeds the pressure maintained with said heat exchanger.

17. The process of claim 1 wherein the pressure maintained within said heat exchanger exceeds the pressure maintained within said reaction zone.

18. The process of claim 8 wherein the pressure maintained within said heat exchanger exceeds the pressure maintained within said reaction zone.

19. A reactor system for the conversion of hdyrocarbons in a bed of solid catalyst comprising:
   (a) a reactor having an inlet and an outlet;
   (b) a heat exchanger comprising a plurality of tube positioned inside said reactor;
   (c) a heat exchanger inlet line extending through the shell of said reactor, said heat exchanger inelt line in communication with said heat exchanger;
   (d) a heat exchanger outlet line extending through the shell of said reactor, said heat exchanger outlet line in communication with said heat exchanger;
   (e) a combustion chamber having inlets for fuel, oxygen-containing gas and regenerator flue gas and an outlet for comustion chamber flue gas;
   (f) means for charging oxygen-containing gas to said combustion chamber; and
   (g) a flue gas inlet line connecting said combustion chamber outlet with said heat exchanger inlet line.

20. The reactor system of claim 19 further comprising a flue gas cooler in communication with said heat exchanger outlet line.

21. The reactor system of claim 20 further comprising an atmospheric vent for venting cooled flue gas to atmospher, said atmospheric vent in communication with said flue gas cooler.

22. A process for transferring heat to a reaction zone comprising the steps of:
   (a) providing a reaction zone containing a solid composite catalyst comprising at least one selected from the group consisting of zeolites and metals;
   (b) charging fuel to a combustion zone;
   (c) charging oxygen-containing gas to said combustion zone;
   (d) withdrawing flue gas from said combustion zone;
   (e) flowing said flue gas through a heat exchanger positioned within said reactin zone;
   (f) transferring heat from said flue gas to said reaciton zone;
   (g) withdrawing said flue gas from said heat exchanger; and
   (h) cooling said flue gas.

23. The process of claim 22 wherien said zeolite has a Constraint Index of from about 1 to about 12.

24. The process of claim 23 wherein said zeolite has the structure of at least one of the group consisting of ZSM-5, ZSM-11, ZSM-22, ZSM-23, ZSM-35 and ZSM-48.

25. The process of claim 24 wherein said zeolite has the structure of ZSM-5.

26. The process of claim 25 wherein said zeolite contains gallium.

27. A process for transferring heat to a reaction zone comprising the steps of:
   (a) providing a reaction zone containing a solid composite catalyst comprising at least one selected from the group consisting of zeolites and metals;
   (b) charging fuel to a heat exchanger positioned within said reaciton zone;
   (c) charging oxygen-containing gas to said heat exchanger;
   (d) combusting said fuel to generate flue gas within said heat exchanger;
   (e) flowing said flue gas through said heat exchanger;
   (f) transferring heat from said flue gas to said reaction zone;
   (g) withdrawing said flue gas from said heat exchanger; and
   (h) cooling said flue gas.

28. The process of claim 27 wherein said zeolite has a Constraint Index of from about 1 to about 12.

29. The process of claim 28 wherein said zeolite hsa the structure of at least one selected from the group consisting of ZSM-5, ZSM-11, ZSM-22, ZSM-23, ZSM-35 and ZSM-48.

30. The process of claim 29 wherein said zeolite has the structure of ZSM-5.

31. The process of claim 30 wherein said zeolite contains gallium.

32. The process of claim 27 wherein the pressure maintained within said reaction zone exceeds the pressure maintained within said heat exchanger.

33. The process of claim 27 wherein the pressure maintained within said heat exchanger exceeds the pressure maintained within said reaction zone.

34. A reactor system for the conversion of hydrocarbons in a bed of solid catalyst comprising:
(a) a vertical cylindrical reactor having an inlet and an outlet;
(b) a heat exchanger comprising a plurality of heat exchanger tubes positioned inside said reactor;
(c) a first heat exchanger inlet line for flowing fuel to said heat exchanger;
(d) a second heat exchanger inlet line for flowing an oxygen-containing gas to said heat exchanger;
(e) a burner positioned inside said heat exchanger in communication with said first and said second heat exchanger inlet lines;
(f) a heat exchanger outlet line for withdrawing flue gas from said heat exchanger;
(g) a flue gas cooler in communication with said heat exchanger outlet line; and
(h) an atomspheric vent for venting cooled flue gas to atmosphere, said atmospheric vent in valved communication with said flue gas cooler.

* * * * *

UNITED STATES PATENT AND TRADEMARK OFFICE
CERTIFICATE OF CORRECTION

PATENT NO. : 4,951,613

DATED : 8/28/90

INVENTOR(S) : M.N. Harandi et al

It is certified that error appears in the above-identified patent and that said Letters Patent is hereby corrected as shown below:

Col. 8, claim 1, line 47, "comustion" should be --combustion--
Col. 9, claim 7, line 3, "6" should be --1--
Col. 9, claim 8, line 19, "combustion" should be --combusting--
Col. 9, claim 11, line 31, "proces" should be --process--
Col. 9, claim 19, lines 1-2, "hdyrocarbons" should be --hydrocarbons--
Col. 9, claim 19, line 59, "inelt" should be --inlet--
Col. 9, claim 37, line 66, "comustion" should be --combustion--
Col. 10, claim 21, lines 7-8, "atmospher" should be --atmosphere--
Col. 10, claim 22, line 20, "reactin" should be --reaction--
Col. 10, claim 22, line 21, "reaciton" should be --reaction--
Col. 10, claim 23, line 26, "wherien" should be --wherein--
Col. 10, claim 29, line 55, "hsa" should be --has--
Col. 12, claim 34, line 8, "atomspheric" should be --atmospheric--

Signed and Sealed this

Fourteenth Day of January, 1992

Attest:

HARRY F. MANBECK, JR.

*Attesting Officer*  *Commissioner of Patents and Trademarks*